United States Patent [19]

Kasai et al.

[11] 4,174,186

[45] Nov. 13, 1979

[54] FLOATING-TYPE ANTI-OIL ANTI-IMPACT ANTI-WAVE BARRIER

[75] Inventors: Hironao Kasai; Hitoshi Fujii; Naoji Toki, all of Nagasaki, Japan

[73] Assignee: Mitsubishi Jukogyo Kabushiki Kaisha, Tokyo, Japan

[21] Appl. No.: 852,523

[22] Filed: Nov. 17, 1977

[30] Foreign Application Priority Data

May 27, 1977 [JP] Japan .............................. 52-67679[U]
May 30, 1977 [JP] Japan .............................. 52-68600[U]

[51] Int. Cl.$^2$ ............................................ E02B 15/04
[52] U.S. Cl. ...................................... 405/71; 405/63; 114/267
[58] Field of Search ............. 9/8 R; 114/267; 61/1 F; 405/63, 64, 68, 69, 70–72

[56] References Cited

U.S. PATENT DOCUMENTS

| 3,050,750 | 8/1962 | Harrison | 61/1 F |
| 3,221,884 | 12/1965 | Muller | 405/63 |
| 3,708,982 | 1/1973 | Blockwick | 114/267 |
| 3,800,542 | 4/1974 | Cerasari | 114/267 |
| 4,062,191 | 12/1977 | Preus | 61/1 F |
| 4,096,700 | 6/1978 | Muramatsu | 405/63 |

FOREIGN PATENT DOCUMENTS 1340472 12/1973 United Kingdom .................. 114/0.5 F Primary Examiner—Trygve M. Blix
Assistant Examiner—D. W. Keen
Attorney, Agent, or Firm—Wenderoth, Lind & Ponack

[57] ABSTRACT

A floating type anti-oil anti-impact anti-wave barrier includes structure for intercepting oil floating on the water, for mitigating an impact force exerted by a ship or the like, and for intercepting waves. The barrier can collect oil which has flowed out onto the sea to prevent the oil from dispersing, and the barrier can be protected from damage caused by a ship, by drift, by waves, etc.

6 Claims, 21 Drawing Figures

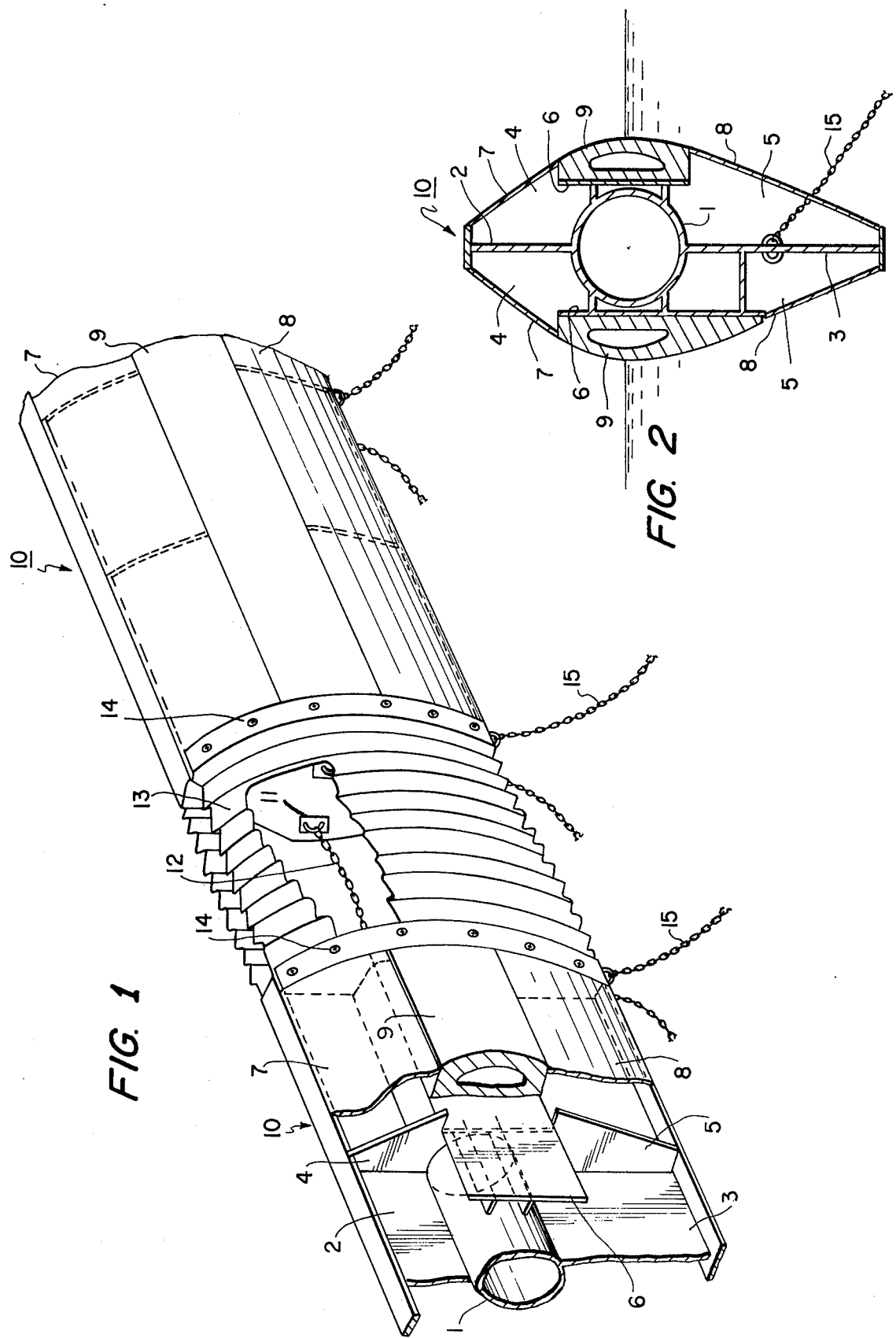

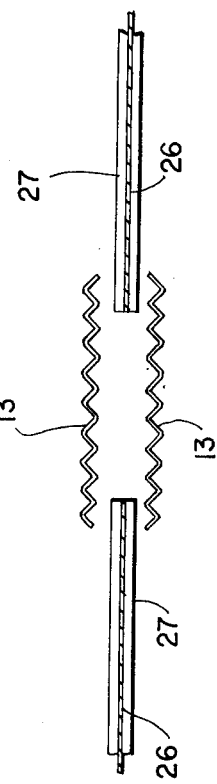
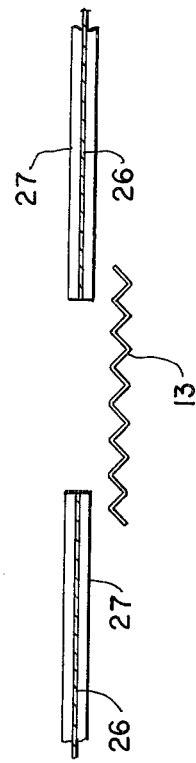
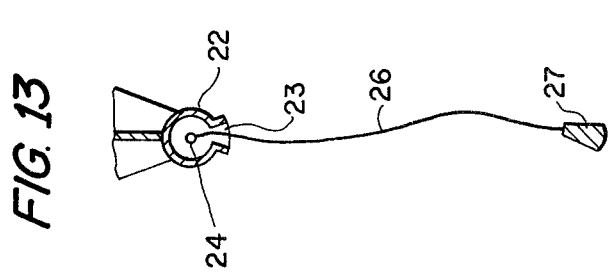
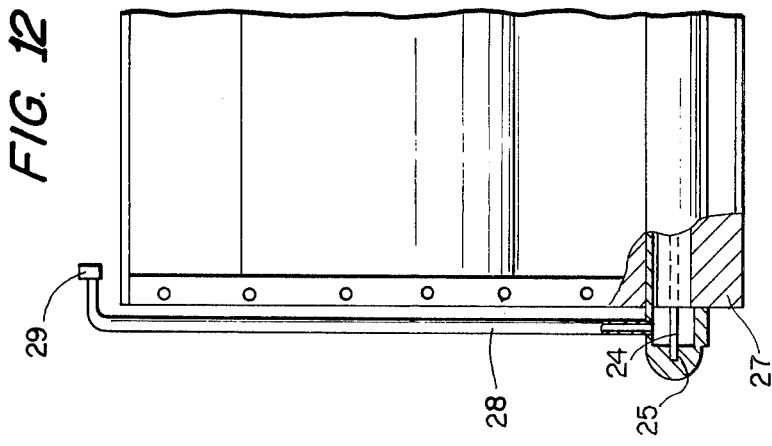

FLOATING-TYPE ANTI-OIL ANTI-IMPACT ANTI-WAVE BARRIER

BACKGROUND OF THE INVENTION

The present invention relates to a floating-tupe anti-oil anti-impact anti-wave barrier.

Configurations of oil fences for preventing oil which has flowed out onto the sea from dispersing are largely different depending upon marine phenomena at the sea region where the oil fence is to be used, transportation equipment for the oil fence, materials of the oil fence, etc. However, in general, an oil fence having a desired length can be constructed by connecting oil fence units by means of water-proof flexible connecting members, each oil fence unit being formed of a float having a given length extending in the longitudinal direction and having an oil leakage preventing plate provided at its bottom along the longitudinal direction of the float.

When an oil outflow accident has occurred, th oil fence is transported to that sea region of the accident and is extended so as to encircle the outflow of oil, and the oil fence extended on the sea can be anchored without drifting because the oil fence has anchoring chains provided with weights mounted at the bottom of the oil leakage preventing plate. However, in the case of such prior art oil fences art, it may possibly happen that the captured outflow of oil escapes by passing under the oil leakage preventing plate due to the effects of waves and the tide.

Inherently, the oil fence is required to function to prevent the encircled oil from flowing out of the oil fence even under the effects of waves and the tide, but it is very difficult to prevent the oil from flowing out of the fence, and especially from passing under the oil fence.

As a result of experiments it has been proved that in the case of the conventional oil fence, leakage of oil would begin at a tidal current of 0.36 m/s (about 0.7 knots). This is caused by the fact that oil captured and pooled on the upstream side of the oil fence is converted into oil drops by tangential forces between the water and oil due to motion of water caused by waves or a tidal current, and that these numberless oil drops are driven by the tidal current and thus drift to the downstream side of water passing beneath the bottom of the oil fence.

As a solution for intercepting the oil passing under the oil fence in the form of oil drops, there have been devised methods of designing the oil fence to have a deep draught, of extending the oil leakage preventing plate downwards to a deeper extent, or of disposing oil fences in a plurality of rows at given intervals. However, in the case of the former two methods, a resistance force of the tidal current against the oil fence is so increased that it becomes difficult to extend the oil fence at a predetermined position, and if the oil fences are equipped in a plurality of rows according to the last method, for instance if the oil fences are extended in two parallel rows, depending upon the size of the oil drops and the speed of the tidal current it may happen that a part of the oil drops which have passed under the inner oil fence further arrive at the bottom of the outer oil fence and thus flow out of the oil fences. To extend the oil fences on the sea in three or more rows for avoiding the above disadvantage, is very troublesome, takes a substantial time for the extension and removal of the oil fences, and is very difficult in operation when wind and waves are even slightly strong.

In addition, the above-described prior art oil fence is liable to be destroyed when it strikes against a ship, a drifting object, etc., and further it is liable to be damaged due to repeated fatigue caused by waves.

SUMMARY OF THE INVENTION

Accordingly, one of the principal objects of the present invention is to provide an improved anti-oil float which can positively collect an outflow of oil and reliably prevent the oil from drifting to a wider sea region upon the occurrence of an oil outflow accident.

Another principal object of the present invention is to provide an improved anti-oil float which can mitigate an impact force exerted thereon by a ship or a drifting object and which thereby can prevent destruction of the float.

Still another principal object of the present invention is to provide an improved anti-oil barrier which can intercept waves, which can prevent collected oil from drifting by dissipating the energy of the waves, and which thereby can prevent damage of the barrier.

In order to achieve the aforementioned objects, the floating type anti-oil anti-impact anti-wave barrier according to the present invention is characterized by the provision of means for intercepting oil floating on the water, means for mitigating an impact force exerted by a ship or the like, and means for intercepting waves.

BRIEF DESCRIPTION OF THE DRAWINGS

The above-mentioned and other features, advantages and objects of the present invention will become more apparent with reference to the following description of preferred embodiments illustrated in the accompanying drawings, in which:

FIG. 1 is a perspective view partly cut away of one preferred embodiment of the anti-oil anti-impact anti-wave barrier according to the present invention, FIG. 2 is a vertical cross-sectional side view of the same, FIG. 12 is a partial front view partly cut away of the same, FIG. 13 is a partial vertical cross-sectional side view of the same showing the state where a screen is extended, FIG. 16 is a plan view of the same barrier, FIG. 17 is a plan view showing a modification of the barrier shown in FIG. 16.

DETAILED DESCRIPTION OF THE INVENTION

Figure 3:
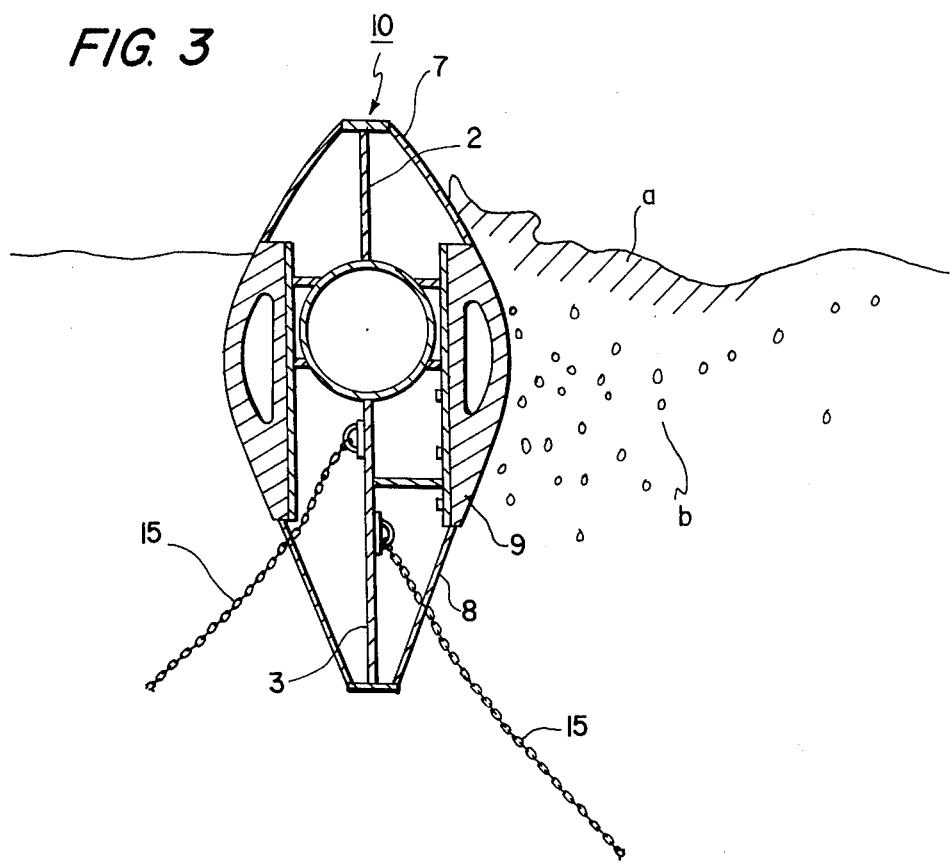
FIG. 3 is a similar vertical cross-sectional side view showing the operating state of the barrier.

FIGS. 1 and 2 illustrate one preferred embodiment of the floating-type anti-oil anti-impact anti-wave barrier according to the present invention; in which reference numeral (1) designates a cylindrical float, numeral (2) designates an above-water fence provided at the top of the float (1) along its longitudinal direction, numeral (3) designates an underwater fence provided at the bottom of the float (1) along its longitudinal direction, numeral (4) designates upper brackets mounted at intervals between the float (1) and the above-water fence (2) numeral (5) designates lower brackets mounted at intervals between the float (1) and the underwater fence (3), and numeral (6) designates intermediate brackets mounted between the float (1) and the respective brackets (4) and (5). Reference numeral (7) designates upper side plates mounted to the upper edges of the above-water fence (2) so as to extend along the longitudinal direction of the float (1), and numeral (8) designates lower side plates mounted to the lower edges of the underwater fence (3) so as to extend along the longitudinal direction of the float (1).

Reference numeral (9) designates buffer members mounted to the respective side plates (7) and (8) and the bracket (6) so as to extend along the longitudinal direction of the float, the outer surfaces of the respective side plates (7) and (8) and the outer surface of the buffer member (9) forming continuously curved convex surfaces connecting the upper edges of the above-water fence (2) and the lower edges of the underwater fence (3) to constitute a barrier body (10), and the cross-sectional width of the barrier body (10) has the maximum value at the proximity of the draught line of the float (1).

In addition, reference numeral (11) designates eye plates provided at the opposite ends of the barrier body (10), numeral (12) designates a chain which connects adjacent barrier bodies (10) via the eye plates (11), numeral (13) designates a bellows-shaped connecting fence provided between adjacent barrier bodies (10), numeral (14) designates bolts for fixedly securing end portions of the fence (13) to adjacent ends of the barrier bodies (10), and numeral (15) designates anchoring chains.

In FIG. 2, the vertical length of the buffer member (9) disposed on the left side of the float (1) is made longer than that of the buffer member (9) disposed on the right side of the float (1).

Since the floating-type anti-oil anti-impact anti-wave barrier according to the present invention is constructed in such manner that the above-water fence (2) is provided at the top of the float (1), the underwater fence (3) is provided at the bottom of the float (1), the side plates (7) and (8) are disposed at least on one side of the float (1) along its longitudinal direction, the outer surfaces of the side plates (7) and (8) and the outer surface of the buffer member (9) are made to form a continuously curved convex surface connecting the upper edge of the above-water fence (2) and the lower edge of the underwater fence (3), and the cross-section width of the barrier body (10) is made to have a maximum value at the proximity of the draught line of the float (1) as described above, the barrier can prevent an outflow oil (a) from moving and taking a suspended state as shown in FIG. 3. Furthermore, the barrier can prevent oil drops (b) from sinking under the barrier body (10) and oil and water drops from jumping over the barrier body (10) by means of the above-water fence (2) as well as the underwater fence (3). Accordingly, the anti-oil effect can be further improved in comparison to the oil fence of the prior art.

Figure 4:
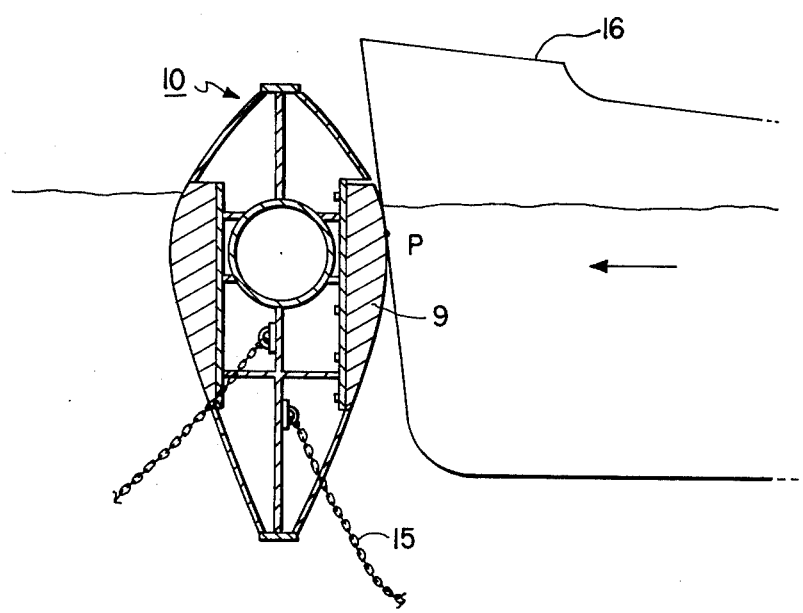
FIGS. 4 to 6 are schematic and diagrammatic views explaining the anti-impact effect of the barrier.
Figure 5:
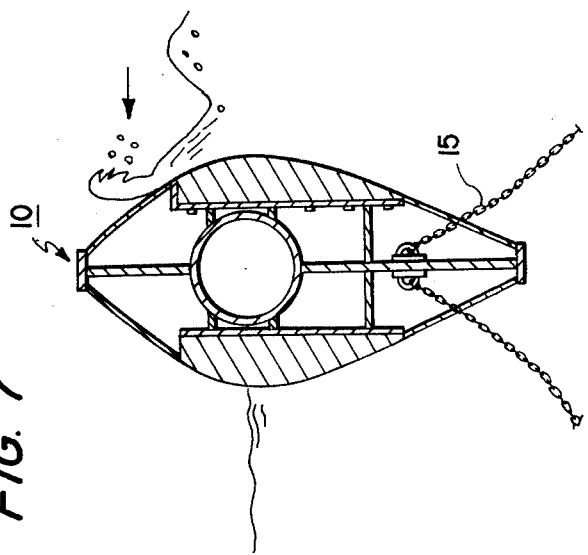
Figure 6:
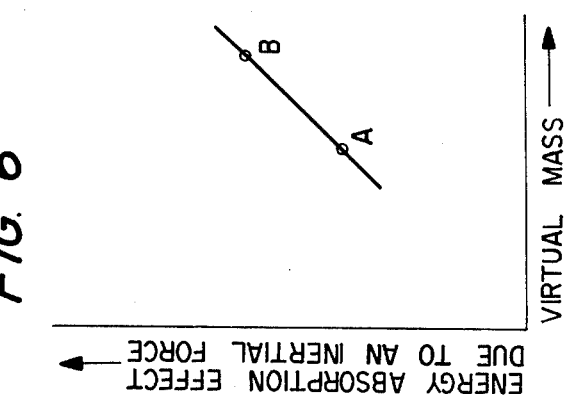

Now the anti-impact effect of the barrier body (10) will be explained with reference to FIGS. 4 to 6. FIG. 4 illustrates the state where a ship or the like (16) has struck against the barrier body (10), in which an impact force is exerted upon a point (P) and the impact energy is absorbed in the manner shown in FIGS. 5(A), 5(B) and 5(C). More particularly, the impact energy is absorbed at first due to an inertial force as shown in FIG. 5(A), and at this moment, the larger the virtual mass of the barrier body (the mass on the water plus the additional mass in the water of the barrier body) is, the more effectively the impact energy is absorbed. Since the above-described barrier body has a larger virtual mass with respect to the same structural weight, the impact energy can be absorbed effectively. The effect in this case is illustrated in FIG. 6. That is, in this figure point (A) represents the absorbing effect for the impact energy in a case where the barrier body consists of only the float, whereas point (B) represents the absorbing effect for the impact energy of the barrier body (10) constructed as shown in FIGS. 1 and 2 and having a larger virtual mass.

Subsequently, the impact energy is absorbed due to a restoring force (a tension of the anchoring chain) and an attenuation force (a fluid resistance depending upon the velocity of the barrier body) as shown in FIGS. 5(B) and 5(C). However, since the share of absorption due to the inertial force is large, the share of the subsequent absorption due to the restoring force and the attenuation force can be reduced.

Figure 7:
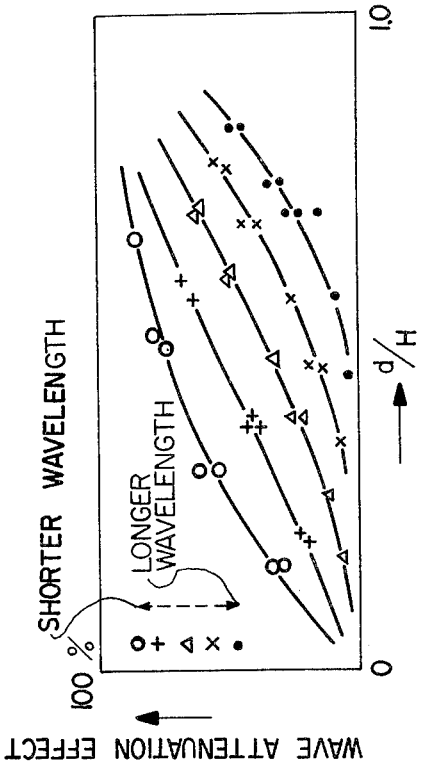
FIGS. 7 to 9 are schematic and diagrammatic views explaining the anti-wave effect of the barrier.
Figure 8:
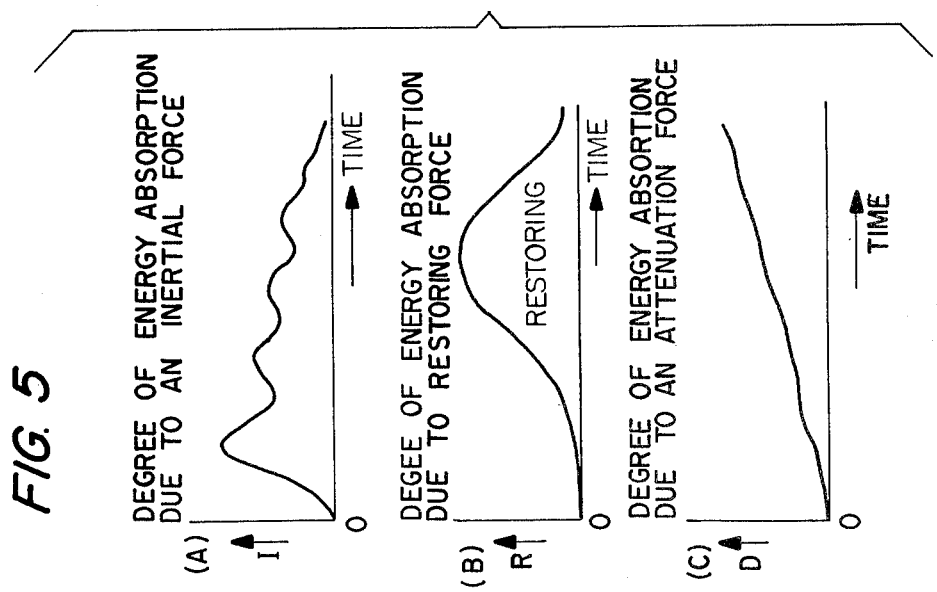
Figure 11:
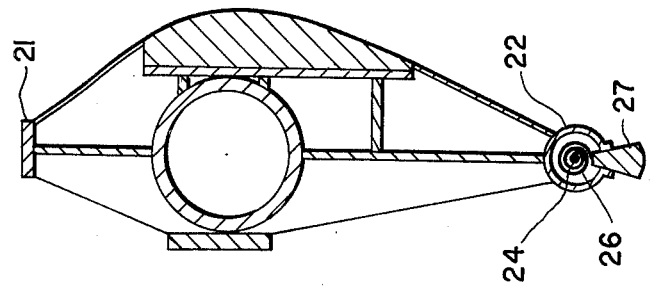
FIG. 11 is a vertical cross-sectional side view showing still another preferred embodiment of the present invention.
Figure 9:
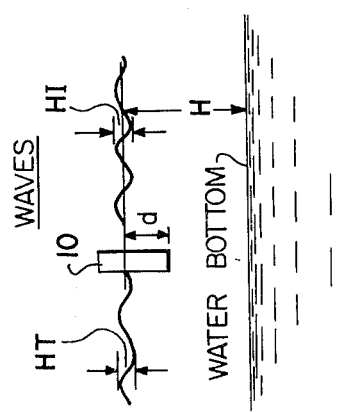

Now the anti-wave effect of the barrier body (10) will be explained with reference to FIGS. 7 to 9. FIG. 7 shows the direction of incidence of a wave to the barrier body (10), and FIG. 8 shows the relation between a wave attenuation effect $\{1-(HT/HI)\}$ obtained by experiments and a parameter d/H, where (H) represents the depth of the water, (HT) represents the height of the waves, and (d) represents the depth of the barrier body. In general, the shorter the wavelength and the deeper the depth of the barrier body, the higher will be the wave intercepting effect, and so, the above-described barrier body (10) achieves an excellent wave intercepting effect owing to the aforementioned construction.

Figure 10:
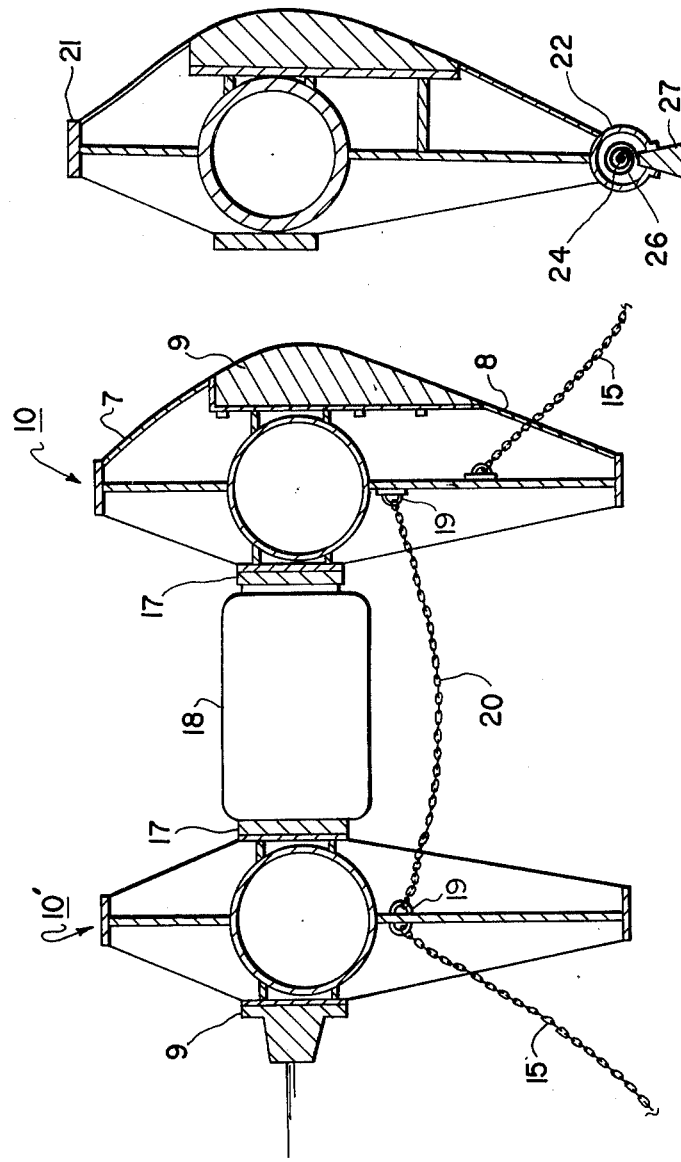
FIG. 10 is a vertical cross-sectional side view showing another preferred embodiment of the present invention.

In a modified embodiment illustrated in FIG. 10, a barrier body (10) provided with side plates (7) and (8) and a buffer member (9) on its outside and another barrier body (10') provided with a buffer member (9) on its outside are arranged parallel to each other. Inside of the respective barrier bodies (10) and (10') are provided flat plate type buffer members (17), between the respective buffer members (17) is provided another buffer member (18), and further, the respective barrier bodies (10) and (10') are connected via eye plates (19) and a chain (20).

FIGS. 11 to 17 illustrate another preferred embodiment of the anti-oil anti-impact anti-wave barrier according to the present invention, in which reference numeral (21) designates an anti-oil barrier constructed substantially in the same manner as the above-described barrier body (10), but to the bottom edge of the barrier body (21) is fixedly and integrally secured a tubular casing cylinder (22) extending in the longitudinal direction, and on the bottom surface of the tubular casing cylinder (22) is provided a slit (23).

In addition, along the axis of the casing cylinder (22) is provided a winding spindle (24), and the opposite ends of the spindle (24) are pivotably supported by bearings (25) provided at the ends of the casing cylinder (22).

Further, a sheet-like screen (26) extends through the slit (23) and has one end fixedly secured to the winding spindle (24), and a weight (27) is fixedly secured to the other end of the sheet-like screen (26).

The weight (27) has a wedge-shaped cross-section, so that when it is inserted from below into the slit (23), the interior of the casing cylinder (22) can be water-tightly sealed.

A lower end of a compressed air introduction pipe (28) opens in the casing cylinder (22), so that compressed air may be fed into the casing cylinder (22) through a piping led from a compressed air source not shown, a connecting plug (29) and the compressed air introduction pipe (28).

Figure 14:
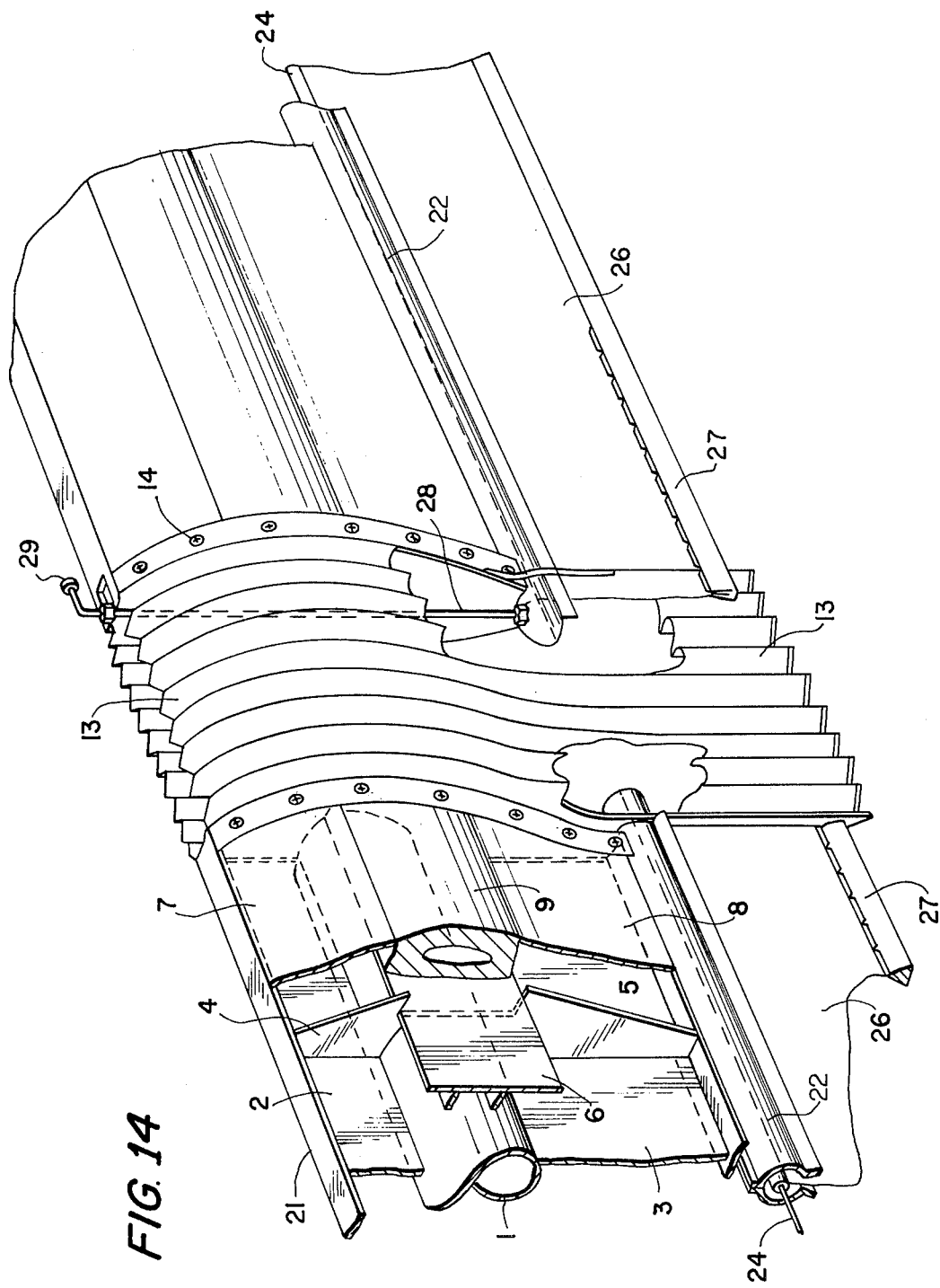
FIG. 14 is a perspective view partly cut away of the same showing the state where the screen is extended.

Further, it is to be noted that the lower end portion of the bellows-shaped connecting fence (13) mounted to the ends of the barrier bodies (21) by means of the bolts (14) extends substantially to the same length as the length of the sheet-like screen (26) when in its lowered position, as shown in FIG. 14.

Since the embodiment shown in FIGS. 11 to 14 is constructed as described above, in a case where oil has flowed out under a calm wave condition, barrier bodies (21) with the sheet-like screen (26) thereof wound around the respective winding spindles (24) and the weights (27) thereof press-fitted into the respective slits (23) could be extended so as to encircle the outflow of oil, and anchoring chains (30) could be engaged with the barrier bodies (21).

Under such an extended condition, the weight (27) is wedged into the slit (23) of the casing cylinder (22), so that the casing cylinder (22) is water-tightly sealed by the weight (27), and the outflow of oil dispersed on the sea can be collected by the barrier bodies (21) and the connecting fences (13) and thereby be prevented from drifting outwardly.

Figure 15:
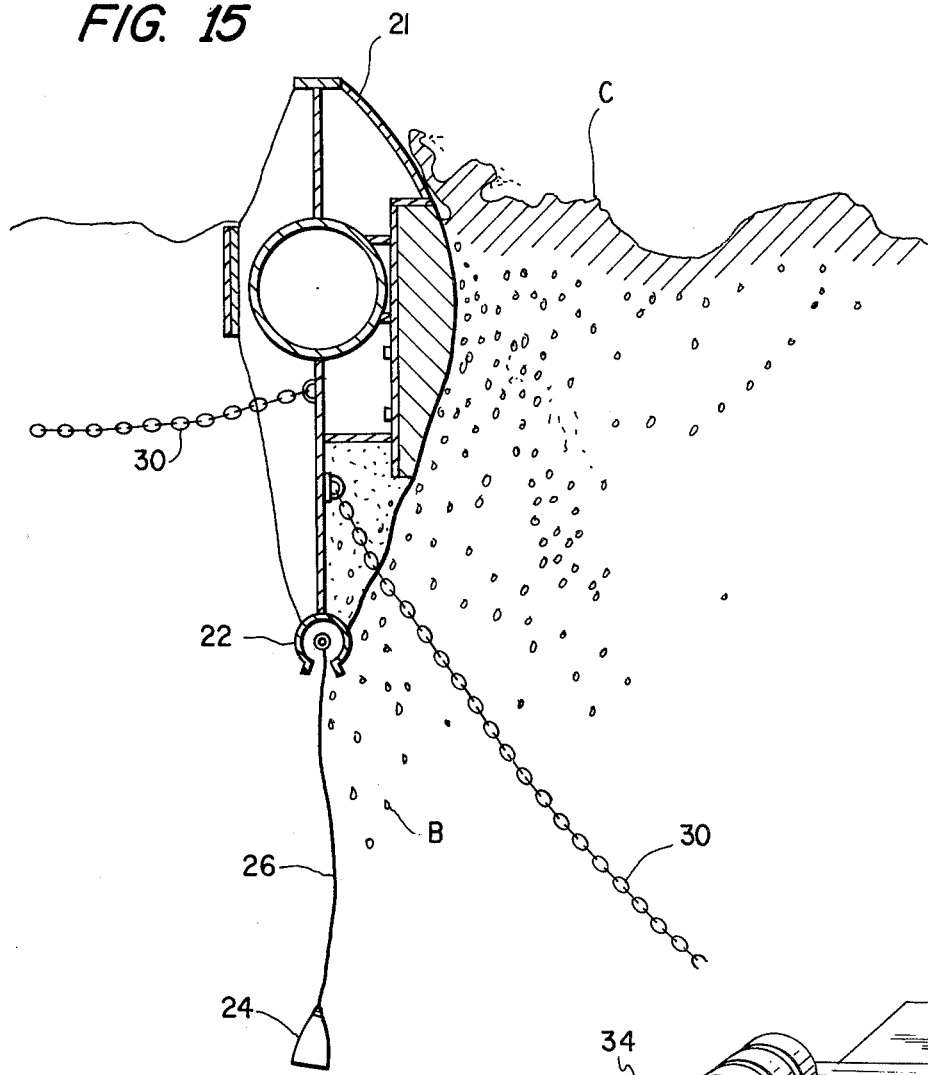
FIG. 15 is a vertical cross-sectional side view showing the operating state of the same.
Figure 19:
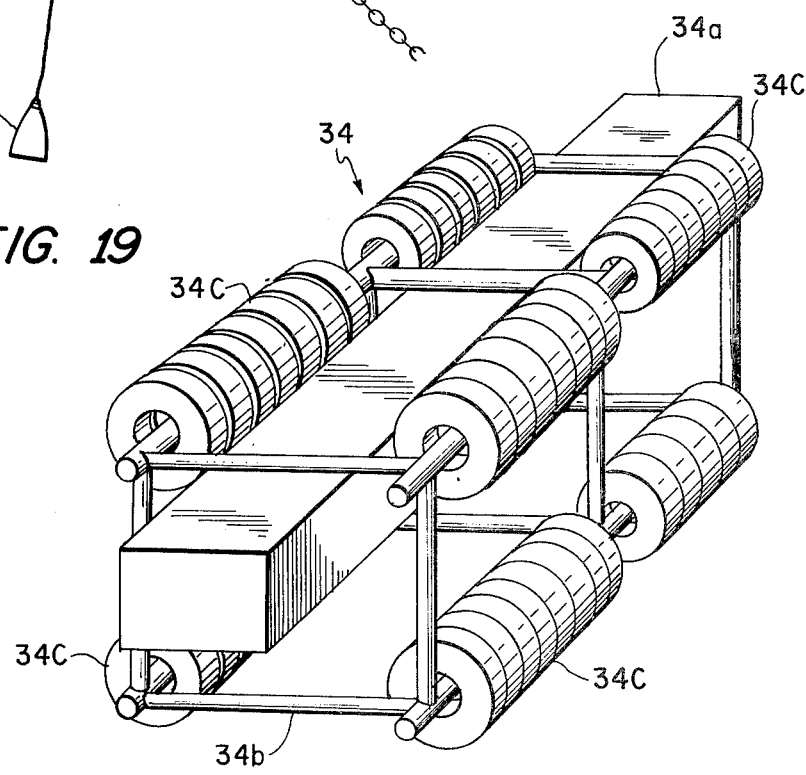
FIG. 19 is a perspective view of a buffer member.
Figure 18:
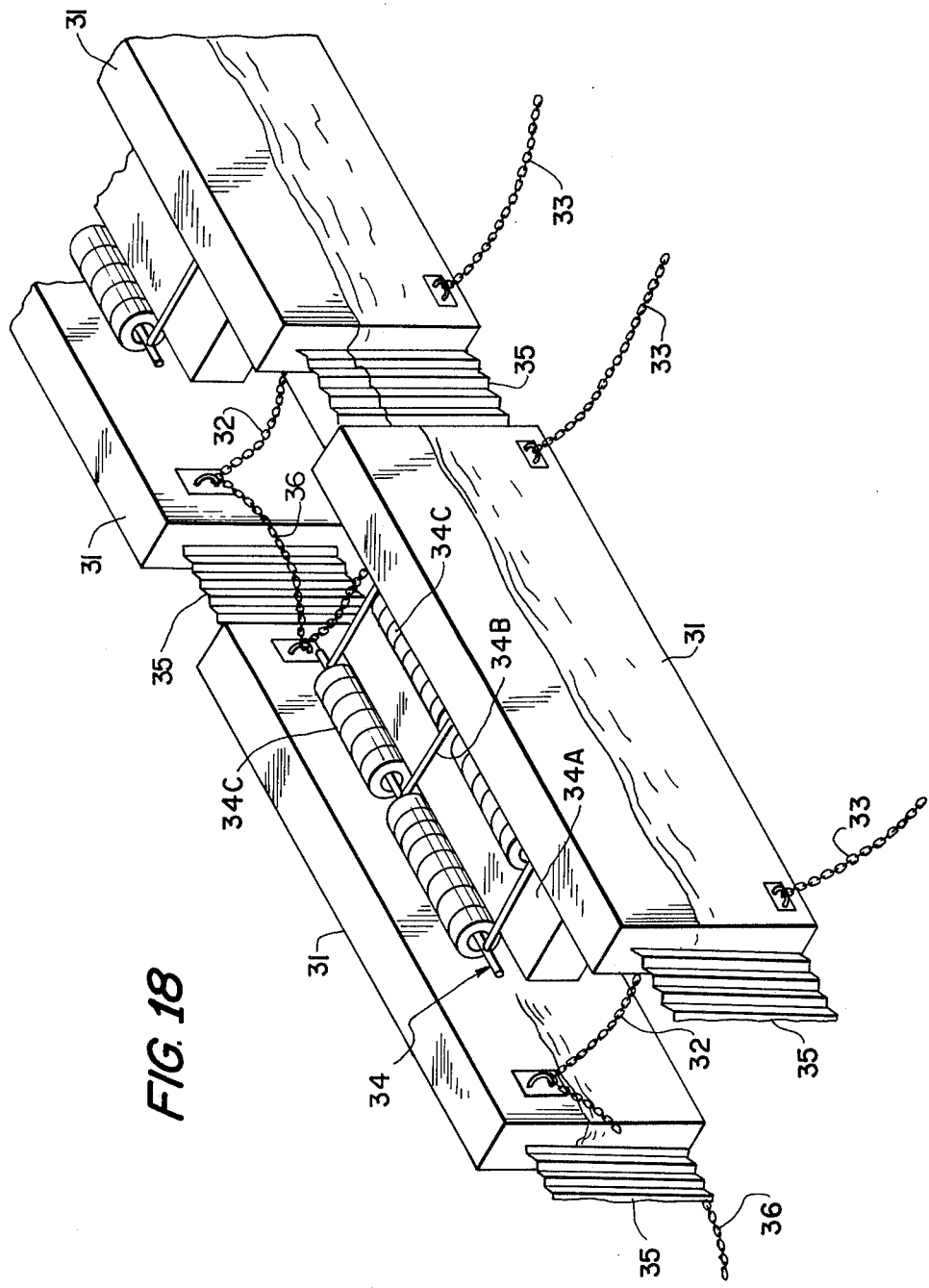
FIG. 18 is a perspective view showing yet another preferred embodiment of the present invention.
Figure 20:
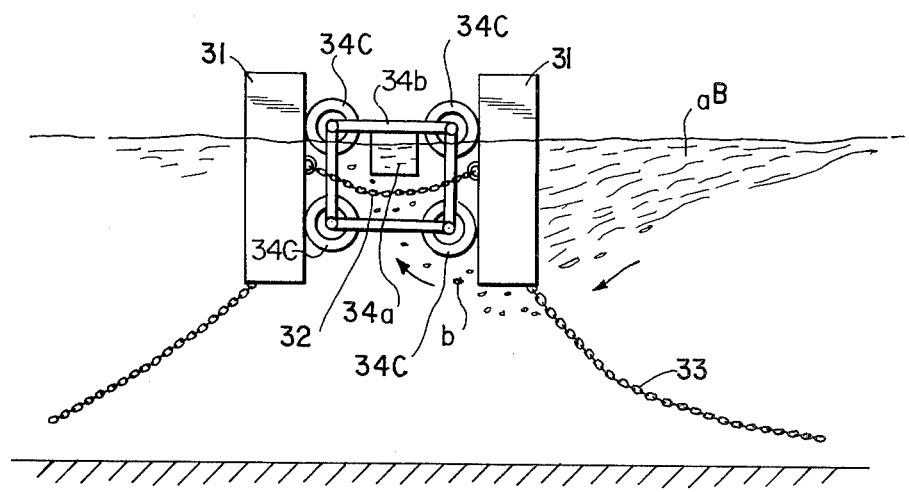
FIGS. 20 and 21 are side views, respectively, showing operating states of the embodiment illustrated in FIG. 18.

However, when conditions are such that the waves are wild and the tidal current is violent, so that the outflow of oil encircled by the barrier bodies is gradually converted into oil drops and escapes by passing under the barrier bodies (21), if compressed air at a high pressure is urged into the casing cylinder (22) via the introduction pipe (28) from a compressed air source not shown, then the wedge-shaped weight (27) is urged to disengage from the slit (23) by this air pressure, and falls down. In accordance with the fall of the weight (27), as shown in FIG. 15 the sheet-like screen (26) is paid out from the winding spindle (24) and is extended downwardly, so that even if the oil drops (B) should sink lower than the bottom of the barrier body (21) due to waves (c), they would not drift to the external sea surface, due to the above-mentioned sheet-like screen (26).

It is to be noted that at the connecting portion between the barrier body (21) and the connecting fence (13), even if a small gap should arise between the fence (13) and the sheet-like screen (26), outflow of the oil drops (B) through the gap is only slight, and thus dispersion of the oil drops (B) can be sufficiently prevented in comparison to the case where no sheet-like screen (26) exists.

As described above, under a normal condition, since it is only necessary to extend barrier bodies (21) having a shallow draught, the equipping operation of the anti-oil barrier is very simple and easy, and as the sheet-like screen (26) is protected by the casing cylinder (22), degradation of the screen (22) can be prevented and its durability can be greatly enhanced.

Also, if it is feared that dispersion of oil drops (B) may occur, since it is only necessary to extend the sheet-like screen (26) by urging compressed air into the casing cylinder (22) through the compressed air introduction pipe (28), the sheet-like screen can be extended very easily even under severe weather conditions.

While the screen (26) is constructed in a sheet-like form in the above-described embodiment, it could be constructed in a fine mesh net form.

In addition, the present invention is, of course, applicable to existing oil fences made of steel.

Furthermore, while the connecting fences (13) are provided on both the inner and outer sides of the barrier bodies (21) as shown in FIG. 16 according to the above-described embodiment, connecting fence (13) could be provided on only one side as shown in FIG. 17. It is to be noted that in these figures component parts equivalent to those of the preceding embodiments are designated by like reference numerals.

Still another preferred embodiment of the present invention is illustrated in FIGS. 18 to 21. In these figures, reference numerals (31) designate a pair of floats disposed in an opposed relationship at a given interval, and each float 31 consists of a hollow rectangular box. Floats 31 are moored to each other by means of chains (32) and are further anchored at the water bottom by means of chains (33).

Reference numeral (34) designates a buffer member serving also as a spacer which is interposed between the pair of floats (31) so as to float itself, and in which on a framework (34b) surrounding a rectangular float (34a) are supported used tires (34c) on the sides of the float (34a) opposed to the floats (31). It is a matter of course that the buffer member (34) can be constructed of various other floatable resilient materials.

In this way, a barrier unit can be constructed of a pair of floats (31) connected to each other by means of the chains (32) and having the buffer member (34) interposed therebetween.

The opposed end surfaces of the floats (31) of the adjacent barrier units are connected via a flexible shielding plate (35), and also between the adjacent ends of floats (31) are connected chains (36) so that the adjacent floats (31) may not be separated by more than a predetermined interval, and thereby damage to the shielding plates (35) may be prevented.

The barrier units constructed in the above-described manner are connected and are made to float on the water surface to be used as an anti-oil anti-impact anti-wave barrier, and in case where a large amount of oil has flowed out due to accidents or the like, even if the floats (31) perfectly encircle the outflow of oil (a), the outflow of oil (a) may be driven and pooled into a thick layer by the floats (31). A part of the pooled oil may be converted into oil drops (b) by the vertical movement of the floats (31), and the oil drops (b) may pass under the bottom surface of the floats (31) and may float up and stagnate on the water surface between the first floats (31) and the opposed floats (See FIG. 20).

Accordingly, it is not easy for the oil drops (b) which have passed beyond the first floats (31) to further pass beyond the second floats (31), and therefore, the illustrated barrier can fully function as an anti-oil barrier.

Figure 21:
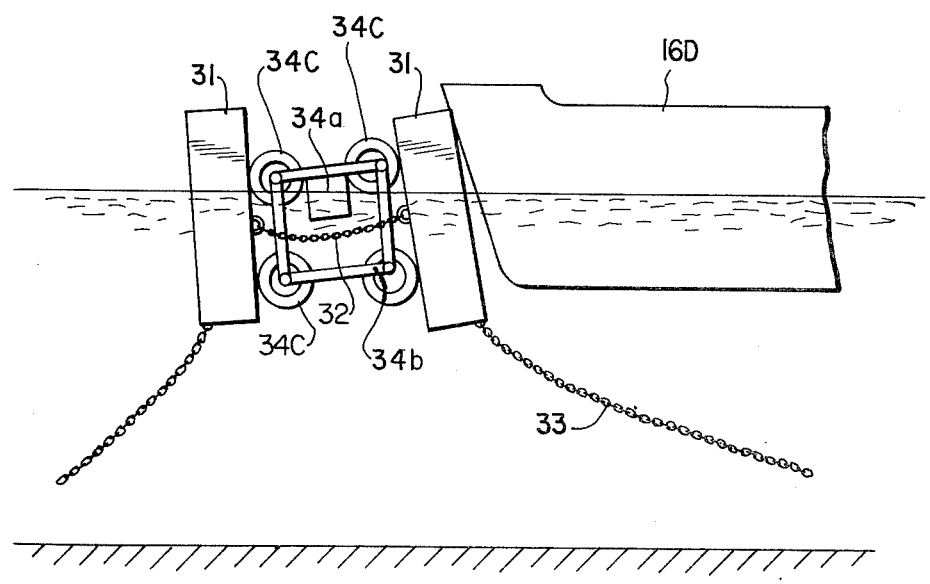

In addition, as shown in FIG. 21, if a ship (16) should accidentally strike against the float (31), then the float (31) would be displaced as urged by the ship and would be pulled by the chain (33), and simultaneously the buffer member (34) is compressed between the pair of floats (31). Since a large number of resilient used tires (34c) are mounted in the buffer member (34), the kinetic energy of the struck ship (16) is absorbed by the buffer member (34).

Also, by effectively making use of frictional attenuation caused by relative movements of water in the space between the pair of floats (31) and the buffer member (34), the kinetic energy of waves can be dissipated.

It is to be noted that since the above-described respective floats (31) are connected by means of chains (32) and a buffer member (34) is interposed between opposed floats (31), that is, since the above-described respective floats (31) are eonnected via flexible soft connecting structures, no excessive force is exerted upon each member, and thus the durability of the barrier can be greatly enhanced.

While the present invention has been described above in connection with preferred embodiments, it is a matter of course that the present invention should not be limited only to such preferred embodiments but many changes in design could be made without departing from the scope of the present invention.

What is claimed is:

1. A floating-type, anti-oil, anti-impact, anti-wave barrier unit comprising:
   a longitudinally extending float adapted to float on a body of water;
   an upper fence member integral with the upper portion of said float and extending upwardly therefrom, said upper fence member extending longitudinally throughout the length of said float;
   a lower fence member integral with the lower portion of said float and extending downwardly therefrom, said lower fence member extending longitudinally throughout the length of said float;
   a buffer member attached to at least one side of said float, said buffer member extending longitudinally throughout the length of said float;
   upper and lower side plates attached to said buffer member and respectively attached to said upper fence member and said lower fence member, said upper and lower side plates extending longitudinally throughout the length of said float;
   said upper and lower side plates and said buffer member having outer surfaces constructed to form a continuously curved and uninterrupted convex surface connecting the upper edge of said upper fence member and the lower edge of said lower fence member; and
   the maximum cross-sectional width of said barrier unit being approximately at the draught line of said float.

2. A barrier comprising a plurality of barrier units as claimed in claim 1, said barrier units being connected in end-to-end fashion with spaces therebetween, and further comprising flexible plates connected to adjacent ends of said barrier units and extending across said spaces.

3. A floating-type, anti-oil, anti-impact, anti-wave barrier unit comprising:
   a longitudinally extending float adapted to float on a body of water;
   a tubular casing cylinder supported beneath said float, said cylinder extending longitudinally throughout the length of said float;
   said cylinder having in the bottom thereof a slit opening into the interior of said cylinder, said slit extending longitudinally throughout the length of said cylinder;
   a winding spindle rotatably supported within the interior of said cylinder and extending longitudinally throughout the length thereof;
   a screen having an upper end extending upwardly through said slit and fixedly secured to said spindle and a lower end having attached thereto a weight, said screen and said weight extending longitudinally throughout the length of said slit;
   said spindle being rotatable to thereby wind up thereon said screen and to raise said weight until said weight is wedged into said slit in a water-tight manner to thereby seal the interior of said cylinder; and
   compressed air feed means for supplying compressed air into the interior of said cylinder, to thereby release said weight from wedging engagement in said slit and to thereby allow said screen to unwind from said spindle.

4. A barrier comprising a plurality of barrier units as claimed in claim 3, said barrier units being connected in end-to-end fashion with spaces therebetween, and further comprising flexible plates connected to adjacent ends of said barrier units and extending across said spaces, said flexible plates extending downwardly to a depth equal to the depth of said weights when said screens are unwound from said spindles.

5. A floating-type, anti-oil, anti-impact, anti-wave barrier unit comprising:
   two longitudinally extending float units adapted to float on a body of water, said float units being arranged to extend parallel to each other and laterally spaced from each other with lateral spaces therebetween, each said float unit including a longitudinally extending float, an upper fence member integral with the upper portion of said float and extending upwardly therefrom, a lower fence member integral with the lower portion of said float and extending downwardly therefrom, and an outer buffer attached to the outer side of said float facing away from said lateral space;
   means for flexibly connecting adjacent laterally spaced said float units; and
   buffer member means positioned in the said lateral space between adjacent laterally spaced said float units, said buffer member means comprising buffer plates attached to inner sides of said floats and a buffer member attached to and connecting said buffer plates.

6. A floating-type, anti-oil, anti-impact, anti-wave barrier unit comprising:
   a plurality of longitudinally extending float units adapted to float on a body of water, said float units being arranged to extend parallel to each other and laterally spaced from each other with lateral spaces therebetween, each said float unit comprising a hollow, rectangular, elongated box-shaped float;

means for flexibly connecting adjacent laterally spaced said float units; and buffer member means loosely positioned in the said lateral space between adjacent laterally spaced said floats, said buffer member means comprising a rectangular floating member, a framework surrounding said floating member, and resilient members mounted on said framework and adapted to loosely abut said floats.

* * * * *